United States Patent [19]

Memeger, Jr. et al.

[11] Patent Number: 5,523,384
[45] Date of Patent: Jun. 4, 1996

[54] PROCESS FOR PREPARING POLYETHER KETONES

[75] Inventors: Wesley Memeger, Jr.; Bruce E. Smart, both of Wilmington, Del.

[73] Assignee: E. I. Du Pont de Nemours and Company, Wilmington, Del.

[21] Appl. No.: 412,774

[22] Filed: Mar. 28, 1995

[51] Int. Cl.$^6$ .............................. C08G 67/02; C08G 8/02
[52] U.S. Cl. .................... 528/392; 528/125; 528/126; 528/128; 528/219
[58] Field of Search ........................ 528/392, 125, 528/126, 128, 219

[56] References Cited

U.S. PATENT DOCUMENTS 4,931,530   6/1990   Fukawa et al. .................... 528/125

FOREIGN PATENT DOCUMENTS 0327984   2/1989   European Pat. Off. .

OTHER PUBLICATIONS

Attwood, T. E., et al, *Polymer*, 22, 1096–1103 (1981).
Fukawa, I. et al, *Macromolecules*, 24, 3838–3844 (1991).
Kricheldorf, H. R. et al, *Polymer*, 25, 1151–1156 (1984).
Kricheldorf, H. R. et al, *Makromol. Chem.*, 191, 2027–2035 (1990).
Kricheldorf, H. R. et al, *Makromol. Chem., Rapid Commun.*, 12, 331–335 (1991).
Kricheldorf, H. R., *Makromol. Chem., Macromol. Symp.*, 54/55, 365–388 (1992).
Johnson, R. N. et al, *J. Polymer Science, Part A–1*, 5, 2375–2398 (1967).

*Primary Examiner*—Shelley A. Dodson

[57] ABSTRACT

Disclosed is a process for preparing polyether ketones comprising reacting one or more bihaloaryl ketones in the presence of a catalyst, co-catalyst and solvent.

19 Claims, No Drawings

PROCESS FOR PREPARING POLYETHER KETONES

FIELD

The present invention concerns a process for preparing polyether ketone polymers by the catalyzed coupling of bishaloarylketones, with alkali metal carbonates serving as the source of ether oxygen. Polyether ketone polymers are useful in composite and fiber applications.

TECHNICAL BACKGROUND OF THE INVENTION

Recent entries into the field of high performance resins and fibers include polyphenylene sulfides, polyetherimides, aromatic polyether-ether ketones (PEEK) and aromatic polyether-ketone-ketones (PEKK). This invention concerns a process for preparing aromatic polyether-ketone-ketones (PEKK). PEKK polymers are currently being made via a two step $AlCl_3$ based Friedel-Craft reaction. Such a process requires virtually stoichiometric quantities of $AlCl_3$ in both steps and also a recrystallization of the material to arrive at the desired isomer. The removal of excess $AlCl_3$ by an extraction and a purification step requires the use of large, ususally expensive, corrosion resistant vessels and drying equipment.

The present invention provides an improvement over the above Friedel-Craft system as it is a one step method and does not require an extensive extraction procedure.

I. Fukawa et al., Macromolecules 24, 3838–3844 (1991) disclose a process for the preparation of aromatic poly(ether ketones) (PEK) by the reaction of an aromatic dihalide with sodium carbonate in the presence of high surface area solid silica catalyst with copper salt co-catalyst. Formation of a PEKK from 1,4-bis(4-fluorobenzoyl)benzene (identified as 4,4"-difluoroterephthalophenone) is reported. Fukawa reported that the reaction occurs on the internal surfaces of pores in the silica particles and on the external surfaces of the silica particles. The present invention presents an improvement over the Fukawa et al. process because the silicon based catalysts used in the present process are more easily separated from the polymer than are the silica particles used by Fukawa et al. For example, present catalysts may be separated by liquid extraction under non-alkaline conditions.

H. R. Kricheldorf and G. Bier, Polymer, 25, 1151–1156 (1984) disclose the preparation of poly(ether ketone)s and poly(ester ether ketone)s by the reaction of 4,4'-difluorobenzophenone with silylated bisphenols.

H. R. Kricheldorf and P. Jahnke, Makromol. Chem, 191, 2027–2035 (1990), disclose the preparation of poly(ether sulfone)s by the reaction of 4,4'-dichlorodiphenyl sulfone with silylated bisphenols.

H. R. Kricheldorf and P. Jahnke, Makromol. Chem., Rapid Commun. 12, 331–335 (1991), disclose the silicon catalyzed synthesis of poly(ether-sulfones) from 4,4'-dihalogenodiphenyl sulfones in the presence of potassium carbonate and N-methylpyrrolidone and N-phenylpyrrolidone solvent.

H. R. Kricheldorf, Makromol. Chem., Macroml. Symp., 54/55, 365–388 (1992), discloses various polymer synthetic methods that involve the polycondensation of silylated aromatic monomers.

SUMMARY OF THE INVENTION

This invention provides a process for preparing poly-ether ketones by contacting one or more bishaloarylketones, by the silanolate/copper salt or silanolate/copper oxide catalysis of ether bridge formation between bischloroarylketones or bisfluoroaryl-ketones using oxygen-containing alkali metal salts as the source of the ether oxygen atom.

The process comprises reacting bischloroarylketones or bisfluoroarylketones under polymerizing conditions in the presence of a) a catalyst selected from the group consisting of alkali metal silanolates, halosilanes and silanols;

b) a copper containing catalyst;

c) a source of oxygen; and d) a solvent in which said catalyst is soluble.

This invention also includes the above process with the addition of a catalytic amount of a co-catalyst, for example cesium fluoride.

DETAILED DESCRIPTION OF THE INVENTION

Poly(ether ketone ketone), PEKK, is a polymer system with exceptional thermal, hydrolytic, solvent and flame resistance. This invention provides a process for the preparation of this high value polymer system.

Provided is a process for the preparation of polyether ketone ketones, PEKK, by the silanolate/copper salt or silanolate/copper oxide catalysis of ether bridge formation between bis chloroaryl ketones or bis fluoroaryl ketones using oxygen-containing alkali metal salts as the source of the ether oxygen atom.

Preferred starting materials include 1,4-bis (4-halobenzoyl)benzene and 1,3-bis (4-halobenzoyl) benzene or a mixture thereof. The most preferred halo group is fluoro.

Preferred silicon containing catalysts for this process include sodium, potassium, cesium or rubidium silanolate, halosilanes, including chloro, bromo, iodo and fluoro silanes, silanols—including silanol ending polydimethylsilozanes, hexaalkylcyclotrisiloxanes, disilazanes and dialkylaminotrialkylsilanes. Most preferred silanolates are potassium trimethyl silanolate and potassium triphenyl silanolate. Most preferred halosilanes are triphenylsilylchloride, triphenylsilylfluoride, trimethylsilylchloride and trimethylsilylfluoride.

Preferred copper containing co-catalysts catalysts for this process comprise copper, cuprous chloride, cuprous bromide, cupric chloride, cupric bromide, cupric acetate, copper(I) oxide and copper(II) oxide. Most preferred is copper(II) chloride.

Oxygen sources include alkali metal carbonates. Preferred oxygen sources comprise sodium carbonate and potassium carbonate. Most preferred is potassium carbonate.

Preferred reaction solvents, in which said catalysts should be essentially soluble, include phenyl sulfone, phenyl ether, tetramethylene sulfone and N-cyclohexyl pyrrolidinone. Most preferred is phenyl sulfone. The catalysts can later, after polymerization, be separated by washing the product with a second solvent.

Preferred optional co-catalysts comprise alkali metal fluorides, most preferably cesium fluoride.

The polymerization process is run at elevated temperatures, usually from about 200° C. to about 340° C. Preferably, the reaction is run at about 300° C. to about 330° C.

Although it is possible to carry out the polymerization reaction at reduced or elevated pressures, it is preferred to carry out the reaction at atmospheric pressure.

The products formed by the process described herein are as used as films, coatings, fibers, composite matrices, adhesives and foams in industrial and aerospace applications that require flame resistance, high heat distortion temperatures and solvent and chemical resistance.

EXAMPLES

Example 1, below describes the preparation of PEKK(T/I-60/40). Additional examples appear in Table I.

In the following example, bis-1,3-(4-fluorobenzoyl)benzene and bis-1.4-(4-fluorobenzoyl) benzene were prepared according to the method of P. M. Hergenrother, N. T. Wakelyn and S. J. Havens, J. Polym. Sci., Part A, Polym. Chem., 25, 1093, (1987). Bis-1,-3-(4-chlorobenzoyl)benzene and bis-1,4-(4-chlorobenzoyl)benzene were prepared according to the method of P. M. Hergenrother and B. J. Jensen, Polymer Prepr, ACS Division Polym Chem., 2(2), 1974(1985).

EXAMPLE 1

To a 2.2 cm I.D. polymer tube with a glass stirrer having a stirring element consisting of three 1.7 cm O.D. and 1.1 cm I.D. ringlets atop one another and nitrogen inlet, was added 1.934 g of 1,4-bis(4-fluorobenzoyl)benzene, 1.289 g of 1,3-bis(4-fluorobenzoyl)benzene, 0.256 g of potassium trimethylsilanolate, 1.38 g of potassium carbonate, 3 g of phenyl sulphone, 0.015 g of cuprous chloride and 0.076 g of cesium fluoride. The tube was connected to a dry nitrogen line and was alternately evacuated and back filled with nitrogen to free the system of air. The tube was then lowered into a 250° C. Woods metal bath and heated with stirring for 0.75 hour. The temperature of the bath was raised to 320° C. and stirring continued for 4 hours. The viscous mixture was allowed to cool to room temperature after which methanol was poured on top of the solid. The reactor was transferred to an ultrasonic bath where the solid mass was transformed into a slurry. The mixture was filtered by suction through a sintered glass Buchner funnel. The solid was washed 3 times with hot methanol in a Waring blender with filtration after each wash. The solid was washed once with hot water and finally once with hot methanol. The polymer was dried in a 100° C. vacuum oven. Yield 3.08 g (103%). The inherent viscoisty was 0.57 in 98% sulfuric acid at 30° C. measured at 0.5 g/dL. The polymer exhibited a PMT (see Table I for reference to method) of 276° C. and yielded fibers several inches long when pulled from a hot bar at 320° C.

TABLE I

PREPARATION OF PEKK

| Example | 1,4 Bis FBz*/ 1,3 Bis FBz (g/g) | Me$_3$SiOK (g) | CuCl$_2$ (g) | K$_2$CO$_3$ (g) | Ph$_2$SO$_2$ (g) | CsFl (g) | Reaction Temp. C./time, h |
|---|---|---|---|---|---|---|---|
| 2 | 1.934/1.289 | 0.256 | 0.03 (CuCl) | 1.38 | 3 | 0 | 320/5 |
| 3 | 1.934/1.289 | 0.321 | 0.042 | 1.725 | 3.5 | 0.046 | 250/0.75 320/4 |
| 4 | 1.934/1.289 | 0.321 | 0.08 | 1.725 | 3.5 | 0.046 | 250/0.75 320/4 |
| 5 | 1.934/1.289 | 0.513 | 0.08 | 1.38 | 6 | 0.015 | 250/0.75 320/4 |
| 6 | 1.934/1.289 | 0.513 | 0.08 | 2.07 | 6 | 0.076 | 250/0.75 320/4 |
| 7 | 1.934/1.289 | 0.128 | 0.08 | 1.38 | 1 | 0.015 | 250/0.75 320/4 |
| 8 | 1.934/1.289 | 0.128 | 0.08 | 1.38 | 6 | 0.015 | 250/0.75 320/4 |
| 9 | 1.934/1.289 | 0.321 | 0.042 | 2.07 | 3.5 | 0.046 | 250/0.75 320/4 |
| 10 | 1.934/1.289 | 0.256 | 0.015 | 1.38 | 3 | 0.076 | 320/4 |
| 11 | 1.934/1.289 | 0.256 | 0.015 | 1.38 | 3 | 0.076 | 320/3 |
| 12 | 1.934/1.289 | 0** | 0.015 | 1.38 | 3 | 0.076 | 260/0.5 320/3 |

*1,4- and 1,3-bis(4-fluorobenzoyl)-benzene
**0.294 g Ph$_3$SiCl used as a catalyst

TABLE II

RESULTS OF PREPARATION

| Example | Comments on Polymerization | Yield (g) | Inherent Viscosity in H$_2$SO$_4$, dL/g | PMT* °C. | Comments on Polymer Behavior |
|---|---|---|---|---|---|
| 2 | Polymer was isolated by washing 3X with hot MeOH, 3X with hot water/acetone (50/50) then with MeOH in Soxhlet extractor for 48 h. | 1.94 | 0.19 | 246 | |
| 3 | Amber initially, then hazy | 3.27 | Insol. | No melt | Film pressed at 300° C./14 psi |

TABLE II-continued

RESULTS OF PREPARATION

| Example | Comments on Polymerization | Yield (g) | Inherent Viscosity in H$_2$SO$_4$, dL/g | PMT* °C. | Comments on Polymer Behavior |
|---|---|---|---|---|---|
|   | opaque (1 h). At 4 h dark maroon unstirrable solid |   |   | to 400 | (97 kPa) was leathery brown and tough |
| 4 | Opaque brown mixture initially. At 2 h brown stirrable mixture. At 4 h brown thin stirrable mixture | 3.78 | 0.41 | 261 | Integral film pressed at 275° C./14 psi (97 kPa). Long fibers obtained from 320 hot bar |
| 5 | Initially dark brown fluid translucent changed to dark brown unstirrable mixture after 4 h. On setting at RT cracked inside peeling fragments away which adhered to solid. | 4.5 | Insol. | No melt to 400 | Film pressed at 300° C./14 psi was leathery brown and tough |
| 6 | Tan opaque initially. At 4 h, wet reddish brown paste | 3.33 | 0.81 | 302 |   |
| 7 | At 4 h a maroon color stirrable thick fluid | 3.08 | 0.57 | 276 | Long fibers obtained from surface at 320° C. hot bar |
| 8 | At 4 h a stirrable thin reddish brown melt | 3.26 | 0.36 | 234 | Long fibers obtained from surface of 320° C. hot bar |
| 9 | At 4 h a unstirrable hard reddish brown mass was obtained | 1.72 | 0.41 partly soluble | No melt to 400 |   |
| 10 |   | 3.1 | 0.8 | 277 | Polymer exhibited excellent adhesion for "Kapton" film |
| 11 | 0.32 g of Polyethylene glycol 1450 (Baker Chemicals) added to rex'n | 3.08 | 1.07 | 248 |   |
| 12 | 0.294 g of Ph$_3$SiCl w&s instead of KOSiMe$_3$ | 2.7 | 1.07 | 277 |   |

*Method described for polymer melt temperature in Sorenson, W.; Campbell, T.W., Preparative Methods of Chemistry, 2nd ed., Interscience: New York, 1968, pp. 57–59, Method A

What is claimed is:

1. A process for preparing a polyether ketone product comprising polymerizing bischloroaryl ketones or bisfluoroaryl ketones, conducted within a temperature range of 200° C. to 340° C., in the presence of:
    (a) a first catalyst selected from the group consisting of alkali metal silanolates, halosilanes and silanols;
    b) a second, copper-containing catalyst
    c) a source of oxygen; and
    d) a first solvent for catalysts (a) and (b);
    wherein said first catalyst is soluble in said first solvent during polymerization and is thereafter separated by washing said product with a non-alkaline second solvent for catalysts (a) and (b).

2. The process of claim 1 with the addition of a catalytic amount of a co-catalyst.

3. The process of claim 2 wherein the co-catalyst is cesium fluoride.

4. The process of claim 1 wherein the temperature is 320° C.

5. The process of claim 1 wherein the polymerizing ketones are selected from the group consisting of 1,4-bis(4-halobenzoyl)benzene and 1,3-bis(4-halobenzyl)benzene and a mixture thereof.

6. The process of claim 1 wherein the solvent is selected from the group consisting of phenyl sulphone, phenyl ether, tetramethylene sulfone, N-methylpyrrolidinone and N-cyclohexyl-pyrrolidinone.

7. The process of claim 5 wherein the solvent is phenyl sulphone.

8. The process of claim 1 wherein the first catalyst is selected from the group consisting of silanol ending polydimethylsilozanes, hexaalkylcyclotrisiloxanes, disilazanes and dialkylaminotrialkylsilanes.

9. The process of claim 1 wherein the first catalyst is selected from the group consisting of sodium silanolate, potassium silanolate, cesium silanolate or rubidium silanolate, halosilanes, silanols, silanol ending polydimethylsilozanes, hexaalkylcyclotrisiloxanes, disilazanes and dialkylaminotrialkylsilanes.

10. The process of claim 1 wherein the first catalyst is selected from the group consisting of potassium trimethyl silanolate and potassium triphenyl silanolate.

11. The process of claim 1 wherein the first catalyst is selected from the group consisting of triphenylsilylchloride, triphenylsilylfluoride, trimethylsilylchloride and trimethylsilylfluoride.

12. The process of claim 1 wherein the second, copper containing, catalyst is selected from the group consisting of copper, cuprous chloride, cuprous bromide, cupric chloride, cupric bromide, cupric acetate, copper(I) oxide and copper(II) oxide.

13. The process of claim 1 wherein the oxygen source is an alkali metal carbonate.

14. The process of claim 1 wherein the oxygen source is selected from sodium carbonate and potassium carbonate.

15. The process of claim 1 wherein the oxygen source is potassium carbonate.

16. The process of claim 13 wherein the second copper-containing catalyst is cupric chloride.

17. The process of claim 1 werein the first catalyst is extracted from the product by use of alcohol.

18. The process of claim 1 wherein the first catalyst is selected from the group consisting of silanol ending polydimethylsilozanes, hexaalkylcyclotrisiloxanes, disilazanes, dialkylaminotrialkylsilanes, sodium silanolate, potassium silanolate, cesium silanolate, rubidium silanolate, halosilanes and silanols.

19. A process for preparing a polyether ketone product comprising polymerizing bischloroaryl ketones or bisfluoroaryl ketones, conducted within a temperature range of 200° C. to 340° C., in the presence of:

(a) a first catalyst selected from the group consisting of alkali metal silanolates, halosilanes and silanols;

b) a second, copper-containing catalyst c) a source of oxygen; and d) a first solvent selected from the group consisting of phenyl sulfone, phenyl ether, tetramethylene sulfone, N-methylpyrrolidinone, and N-cyclohexyl-pyrrolidinone;

wherein said first catalyst is soluble in said first solvent during polymerization and is thereafter separated by washing said product with a second solvent for catalysts (a) and (b) under non-alkaline conditions.

* * * * *